United States Patent
Chun

[19]

[11] Patent Number: 6,102,419
[45] Date of Patent: Aug. 15, 2000

[54] SUSPENSION SYSTEM FOR ELECTRIC CAR

[75] Inventor: Dong-Kee Chun, Ansan, Rep. of Korea

[73] Assignee: Hyundai Motor Company, Seoul, Rep. of Korea

[21] Appl. No.: 09/220,804

[22] Filed: Dec. 28, 1998

[30]     Foreign Application Priority Data

Dec. 30, 1997 [KR]   Rep. of Korea ...................... 97-79440

[51] Int. Cl.[7] ................................................... B60G 7/00
[52] U.S. Cl. .................................... 280/124.135; 180/199
[58] Field of Search ..................... 280/124.138, 124.139, 280/124.135, 5.52, 5.521, 124.134, 124.145, 98, 103; 180/199, 198

[56]            References Cited

U.S. PATENT DOCUMENTS

| | | | |
|---|---|---|---|
| 5,238,261 | 8/1993 | Ogiso ....................................... | 280/667 |
| 5,348,334 | 9/1994 | Giltinan .................................. | 280/961 |
| 5,364,114 | 11/1994 | Petersen ................................. | 280/95.1 |
| 5,496,055 | 3/1996 | Shibahata et al. ...................... | 280/665 |
| 5,700,025 | 12/1997 | Lee ......................................... | 280/661 |
| 5,722,504 | 3/1998 | Gaetani ................................... | 180/411 |

*Primary Examiner*—Kevin Hurley
*Assistant Examiner*—Kevin McKinley

[57]              ABSTRACT

A suspension system for electric car constructed and arranged to prevent interference from suspension system and steering system even when wheels are steered with steering angle thereof established upto 90 degrees, thereby making it easy to park the electric car in small space and minimizing a rotary radius, the electric car including a knuckle connected to wheels so as to steer by way of a tie rod the wheels independently driven by a motor, the suspension system comprising: a horizontal arm coupled for horizontal rotation, being disposed at a higher position than upper end of the knuckle and tires, and mounted for elevated motion with the knuckle; a plurality of upper arms, one end of which being rotatably connected to both ends of the horizontal arm and the other end of which being pivoted to a body of the electric car in forward and backward directions thereof; an arm support, one end of which being rotatably connected to a part where the horizontal arm and the upper arm join, and the arm support being formed to be escaped from tire rotating radius when the wheels are steered; and a lower arm, one end of which being rotatably connected to one end of the arm support and the other end of which being pivoted to a rear position of tire.

7 Claims, 3 Drawing Sheets

SUSPENSION SYSTEM FOR ELECTRIC CAR

BACKGROUND OF THE INVENTION

1. Field Of The Invention

The present invention relates to a suspension system, and more particularly to a suspension system applied to a wheel-in-motor type electric car.

2. Description Of The Prior Art

Generally, suspension systems are designed to reduce vibrations or shocks received from the roadbed while a vehicle is running and to maintain a stability of a running vehicle.

The suspension system thus described generally includes a spring for absorbing shocks transmitted from the roadbed, a shock absorber for restraining vibrations of the spring, a plurality of arms for cooperatively moving with the shock absorber and the spring to substantially control the stance of a vehicle, and a plurality of links.

The suspension systems thus described are constructed respectively differently according to use and structure of a vehicle, and particularly, in case of an electric car where its weight is light and structure of wheels is simple (driving apparatus, brake system and the like), structure and installation of suspension system are relatively simple.

In other words, as illustrated in FIG. 5, a suspension system applied to a wheel-in-motor electric car is disposed with wheels 50 mounted with tires (T), a motor 51 centrally provided at the wheel 50 for rotating the wheel 50, and a knuckle 54 connected to the motor 51 and simultaneously arranged and connected to an upper 52 and lower arm 53.

Of course, the knuckle 54 is arranged with a tie rod (not shown) for wheel steering via a joint.

SUMMARY OF THE INVENTION

However, there is a problem in the suspension system for electric car according to the prior art in that wheels receive interference from parts relates to suspension system or steering system such as the arm, the lower arm, tie rod or the like when the wheels are steered such that steering angle of wheels cannot be established less than a predetermined angle (approximately 48 degrees) to subsequently enlarge a minimum rotating radius to no purpose.

Furthermore, it is very difficult to park a vehicle with a largely established minimum rotating radius in a small space, to thereby provide a difficulty to a novice driver in parking.

Accordingly, the present invention is disclosed to solve the aforementioned problem and it is an object of the present invention to provide a suspension system for electric car constructed and arranged to prevent interference from suspension system and steering system even when the wheels are steered with steering angle thereof established up to 90 degrees, thereby making it easy to park the electric car in a small space and minimizing a rotary radius.

In accordance with the object of the present invention, there is provided a suspension system for electric car including a knuckle connected to wheels so as to steer by way of a tie rod the wheels independently driven by a motor, the suspension system comprising:

a horizontal arm coupled for horizontal rotation, being disposed at a higher position than upper end of the knuckle and tires, and mounted for elevated motion with the knuckle;

a plurality of upper arms, one end of which being rotatably connected to both ends of the horizontal arm and the other end of which being pivoted to a body of the electric car in forward and backward directions thereof;

an arm support, one end of which being rotatably connected to a part where the horizontal arm and the upper arm join, and the arm support being formed to be escaped from tire rotating radius when the wheels are steered; and a lower arm, one end of which being rotatably connected to one end of the arm support and the other end of which being pivoted to a rear position of tire.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
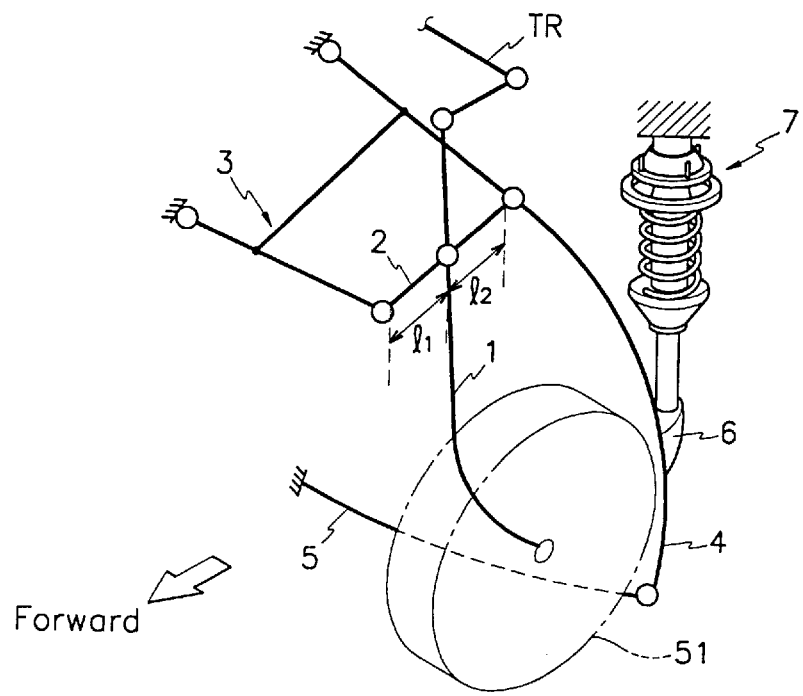
FIG. 1 is schematic perspective view for illustrating a suspension system of an electric car according to the present invention.

The preferred embodiment of the present invention will now be described in detail with reference to the accompanying drawings.

As illustrated in FIGS. 1, 2, 3 and 4, the suspension system includes a knuckle 1 for being connected at one end thereof to a wheel 51 and connected at the other end thereof to a tie rod (TR) for steering of the wheel 51, a horizontal arm 2 centrally coupled to the knuckle 1 to enable the knuckle 1 to perform a rotary movement and mounted at an axle for horizontal movement with the knuckle 1, a plurality of upper arms 3 for being connected at one end thereof to both ends of the horizontal arms 2 for rotary movement and pivoted at the other end thereof to a body of the electric car, an arm support 4 for being rotatably connected at one end thereof to a rear position where the horizontal arm 2 and the upper arm 3 join and for being so formed as to escape from a rotary radius of the tire (T) when the wheel 51 is steered, a lower arm 5 for being rotatably connected at one end thereof to one end of the arm support 4 and for being pivoted at the other end thereof behind the tire (T) to the body, and a strut assembly 7 for being fixed at one end thereof to part of the arm support 4 via a bracket 6 and for being approximately vertically fixed at the other end thereof to the body.

Furthermore, the connection part between the horizontal arm 2 and the knuckle 1, and another connection part between the horizontal arm 2, upper arm 3 and the arm support 4 are arranged at a higher position to escape from rotary radius when the tire (T) are rotated.

The upper arm 3 forms an angle of $\theta_1$ at its connection part to the body when it is viewed from plane side around tire (T) and forms an angle of $\theta_2$ when it is viewed from a section side thereof. In other words, according to $\theta_1$ and $\theta_2$, a contact point between the roadbed and the tire (T) moves toward P direction when the tire (T) bounces, whereby, a forward pressing force moves forward against a vertical line of tire (T) when the car is stopped to improve anti-dive characteristics.

Furthermore, in order to provide a compliance characteristics against lateral force while an electric car equipped with a suspension system is running, a line length ($l_1$) of the horizontal arm 2 toward front of the body is longer than a line length ($l_2$) of the horizontal arm 2 toward rear of the body around a point where the knuckle 1 is connected to the horizontal arm 2 at the upper arm 3, and at the same time, a mounted area of the lower arm 5 is established at a rearer position than the center of the wheel 51.

Still furthermore, in order to provide a camber characteristic of the wheel 51, an angle formed by wheel connection to the knuckle 1 and the arm support 4 of the lower arm 5, and an angle formed by connection area between the horizontal arm 2 and the knuckle 1 are respectively given as $\theta_5$ and $\theta_6$.

In order to provide a restoring force and straight forwardness of the electric car, an angle formed between the knuckle 1 and inclination of king pin is given as $\theta_3$ and a caster angle is given as $\theta_4$.

Of course, the values of $\theta_1$, $\theta_2$, $\theta_3$, $\theta_4$, $\theta_5$ and $\theta_6$, and $l_1$ and $l_2$ are determined by wheel alignment values generally applied to the suspension system according to characteristics of an electric car when a steering system is designed.

Now, operational effect of the present invention thus constructed will be described in detail.

When tires (T) of the electric car bounce according to the roadbed when the car is running, the knuckle 1 bounces up and down along with the wheels and the lower arm 3 connected to the arm support 4 via the horizontal arm 2 also bounces up and down, whereby shocks and vibrations are absorbed by the strut assembly 7 when the arm support 4 bounces up and down.

At this time, stability and roadability of the car are appropriately maintained by $\theta_1$, $\theta_2$, $\theta_3$, $\theta_4$, $\theta_5$ and $\theta_6$ comprising the wheel alignment. When the wheels 51 are rotated via the tie rod (TR) while the car is running or parked, the knuckle 1 is rotated along with the tie rod (TR).

When the knuckle 1 is rotated, the wheels connected thereto are also rotated, and because there is no part which interferes with the tires (T) within a rotating radius of tires (T) when the wheels 51 are rotated, the tires (T) can be substantially rotated up to approximately 90 degrees.

In other words, because the arm support 4 connecting the lower arm 5 to the upper arm 3 is curvedly formed, the tires (T) are not interfered by the arm support 4, and because the connection part between the horizontal arm 4 and the upper arm 3 is formed at a higher position that those of the tires (T), the tires (T) are not interfered in rotation.

Figure 2:
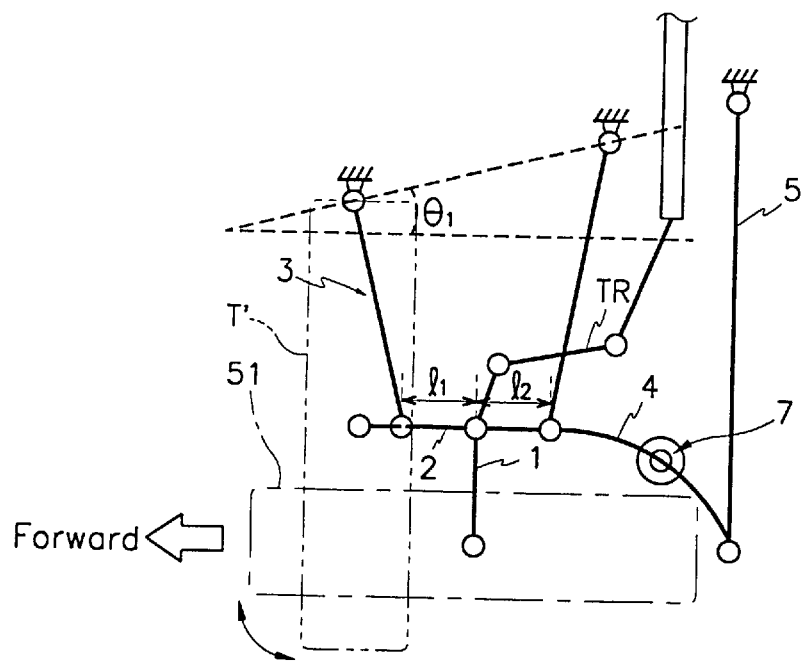
FIG. 2 is a plane of FIG. 1.
Figure 3:
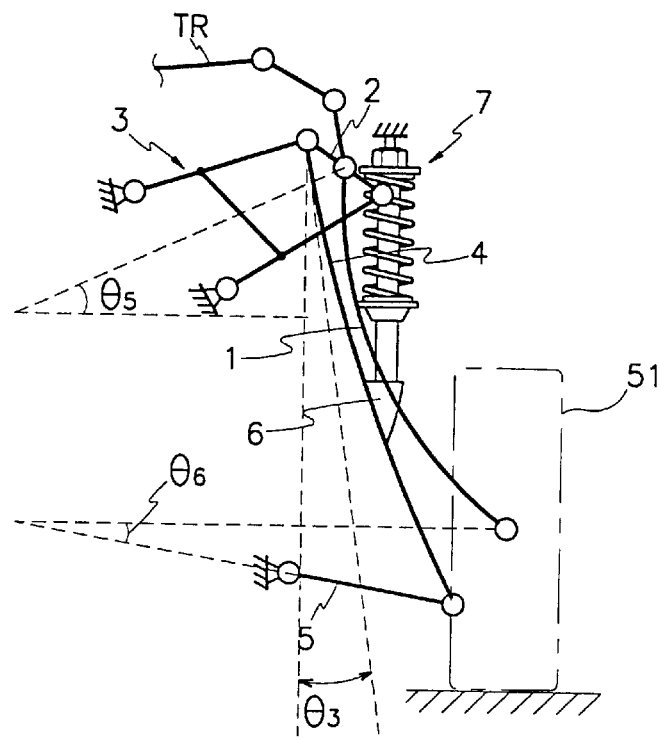
FIG. 3 is a front elevation of FIG. 1.
Figure 4:
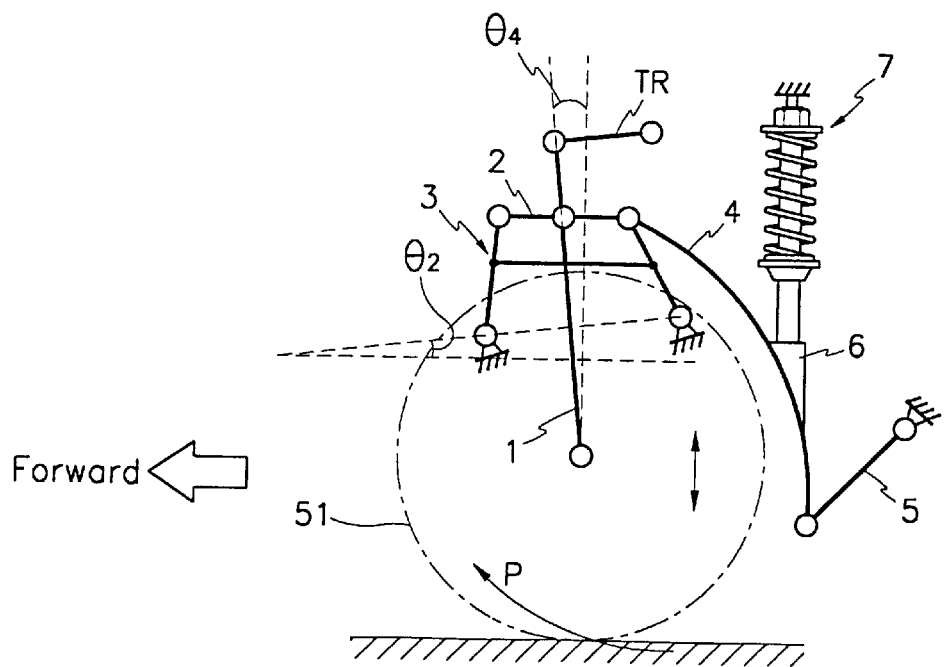
FIG. 4 is a side view of FIG. 1.
Figure 5:
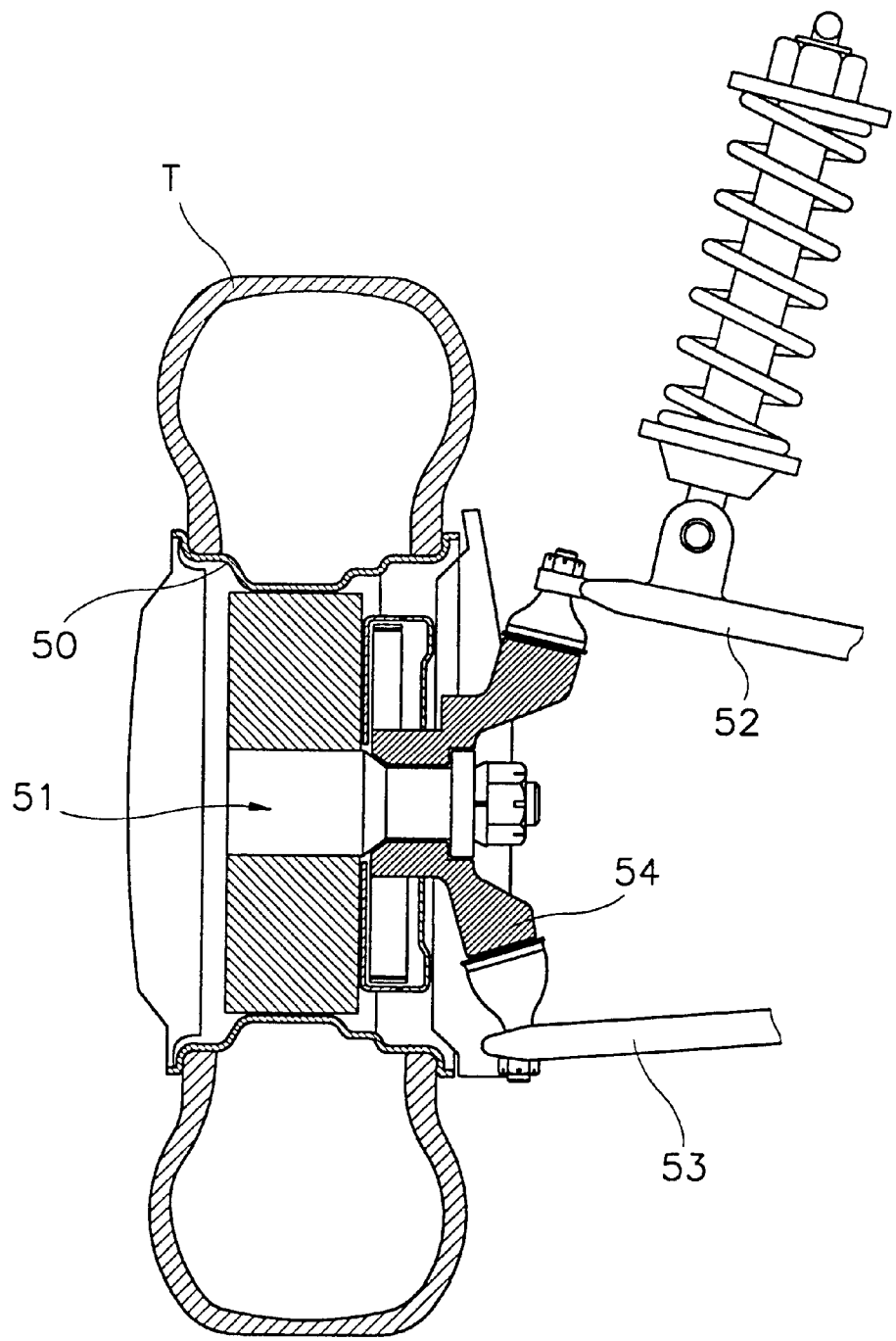
FIG. 5 is a front sectional view for illustrating wheel-in-motor type suspension system in a conventional electric car.

Of course, construction for generating a driving force is a wheel-in-motor type mounted with respective motors in the wheels, such that power transmission construction for driving the wheels 51 is designed to remove an area where an interference is made with the tires (T) and wheel housing (not shown) where the tires (T) are accommodated in also formed not to interfere with a rotating position of tire (T') shown in alternate long and two short dashes line in FIG. 2.

As mentioned above, when the knuckle 1 is rotated up to approximately 90 degrees, the tires (T') can be positioned as per the alternate long and two short dashes line in FIG. 2, to thereby enable a car to move laterally.

Furthermore, in comparison with tires (T) applied with conventional suspension system which can rotate only up to 48 degrees due to interference from such driving systems as drive shaft and the like during slow rotation, rotating angle of tires according to the suspension system applied with the present invention can be further enlarged, to thereby make the minimum rotating radius much smaller.

By way of example, after a driver parks a car in a relatively small space, and he or she rotates the tie rod (TR) and the knuckle 1 by 90 degrees to position the tire (T') as per the alternate long and two short dashes line. When the tires (T') are laterally positioned, a car is driven forward or backward to laterally move the car, by which, it is very easy to park the car in a relatively small space.

As apparent from the foregoing, there is an advantage in the suspension system of a wheel-in-motor type electric car according to the present invention, in that an arm support connecting an upper and a lower arm is mounted outside of wheels, such that tires can be rotated up to approximately 90 degrees when the tires are steered to remarkably improve a convenience of steering operation when a car is parked or rotated.

What is claimed is:

1. A suspension system for electric car including a knuckle connected to wheels so as to steer by way of a tie rod the wheels independently driven by a motor, the suspension system comprising:

a horizontal arm coupled for horizontal rotation, being disposed at a higher position than upper end of the knuckle and tires, and mounted for elevated motion with the knuckle;

a plurality of upper arms, one end of which being rotatably connected to both ends of the horizontal arm and the other end of which being pivoted to a body of the electric car in forward and backward directions thereof;

an arm support, one end of which being rotatably connected to a part where the horizontal arm and the upper arm join, and the arm support being formed to be escaped from tire rotating radius when the wheels are steered; and a lower arm, one end of which being rotatably connected to one end of the arm support and the other end of which being pivoted to a rear position of tire.

2. The suspension system as defined in claim 1, further comprising a strut assembly, one end of which being fixed to part of the arm support and the other end of which being almost vertically fixed to body of the electric car.

3. The suspension system as defined in claim 1, wherein a rotably connected area between the upper arm and the body of the electric car is higher at a rear side thereof than at the front side to improve an anti-dive characteristic and is mounted deep into the center hereof to have angles of $\theta_1$ and $\theta_2$.

4. The suspension system as defined in claim 1, wherein length of the horizontal arm is longer toward front side of the electric car and shorter toward rear side of the electric car and shorter toward rear side of the electric car around a connection part between the knuckle and the horizontal arm.

5. The suspension system as defined in claim 1, wherein angle formed by wheel connection part of knuckle and arm support connection part of lower arm and an angle formed by the horizontal arm and the knuckle are $\theta_5$ and $\theta_6$ respectively to provide a camber value to the wheels, whereby, the angles are differently constructed.

6. The suspension system as defined in claim 1, wherein a kingpin inclination which is formed by an inclination of the knuckle and a vertical line is given as $\theta_3$.

7. The suspension system as defined in claim 1, wherein a caster angle formed by the knuckle and a vertical line is given as $\theta_4$.

* * * * *